United States Patent
Yu et al.

(10) Patent No.: US 9,459,840 B1
(45) Date of Patent: Oct. 4, 2016

(54) TIMING-ORIENTED AND ARCHITECTURE-CENTRIC SYSTEM DESIGN USING CONTRACTS

(71) Applicant: TOYOTA JIDOSHA KABUSHIKI KAISHA, Toyota-shi, Aichi-ken (JP)

(72) Inventors: Huafeng Yu, Cupertino, CA (US); Jean-Pierre Talpin, Saint Grégoire (FR); Sandeep K. Shukla, Falls Church, VA (US)

( * ) Notice: Subject to any disclaimer, the term of this patent is extended or adjusted under 35 U.S.C. 154(b) by 0 days.

(21) Appl. No.: 14/674,723

(22) Filed: Mar. 31, 2015

(51) Int. Cl.
 *G06F 9/44* (2006.01)
(52) U.S. Cl.
 CPC .. *G06F 8/20* (2013.01); *G06F 8/10* (2013.01)
(58) Field of Classification Search
 None
 See application file for complete search history.

(56) References Cited

U.S. PATENT DOCUMENTS

| | | |
|---|---|---|
| 8,250,524 B2 | 8/2012 | Barnett et al. |
| 8,631,160 B2 | 1/2014 | Joublin et al. |
| 2004/0015833 A1* | 1/2004 | Dellarocas ............... G06F 8/20 717/106 |

* cited by examiner

*Primary Examiner* — Chuck Kendall
(74) *Attorney, Agent, or Firm* — Burbage Law, P.C.; Jon-Michael Burbage; Elizabeth Ruzich

(57) ABSTRACT

The method may include designing one or more software models for one or more software components to be included in an embedded system. The method may include collecting information from the one or more requirements, the one or more software components, and the one or more software models. The method may include generating one or more architecture models that describe an execution platform, physical constraints, non-functional constraints, and characteristics of the embedded system based on the collected information. The method may include determining timing semantics to be satisfied by execution of functions in the embedded system. The method may include generating, by an electronic device, contracts based on the one or more requirements, the one or more software components, the one or more software models, the one or more architecture models, and the timing semantics.

20 Claims, 7 Drawing Sheets

TIMING-ORIENTED AND ARCHITECTURE-CENTRIC SYSTEM DESIGN USING CONTRACTS

BACKGROUND

The specification relates to a timing-oriented and architecture-centric system design using contracts.

The design of embedded systems, including automotive systems using conventional design approaches and programming methods may be difficult. In particular, these conventional design approaches and programming methods may be incapable of determining the correctness and performing verification of non-functional properties, such as timing-related properties, for the embedded system.

In the last decade, the size of the embedded system has dramatically increased. For example, an automotive embedded system may have more than 100 engine control units and millions of lines of code. Attempts have been made to reduce the system complexity and a time to market constraint, by using a model-based design approach and early-phase validation technologies. These attempts have been widely adopted and practiced in industry. However, system integration and its analysis, verification, and validation, even at the model level is still a big challenge due to the heterogeneity of the models and/or languages used in the design and different semantics adopted to create the embedded system.

Architecture design is also becoming a critical issue due to a large number of heterogeneous components in the system. An effective architecture design has a great impact on cost, timing, performance, safety, reliability, etc.

Timing, with regard to a specific architecture, is another significant issue considered in designing an embedded system, particularly in the integration phase. However, timing is hardly verified at the system-level.

SUMMARY

An embedded system may be generated based on requirements, prototypes that include software components, virtual prototypes that include software models, and formal specifications. The formal specifications each include an architecture model, timing semantics, and a contract.

The architecture model may describe an executing platform including hardware and software used by the software components and the software models, physical constraints, non-functional constraints, and characteristics of the embedded system. The architecture model and the timing semantics may be generated based on information collected from the requirements, the software components, and the software models. The architecture model may be generated using a modeling language or a formal language.

The timing semantics may be determined to be satisfied by execution of functions that are correctly executed in the architectural model. The timing semantics may include synchronization and ordering of events, computing a time to execute the functions in the embedded system, and delay that occurs when executing the functions and communication between the functions. The architecture model may also include a behavior model and the timing semantics may also be determined to be satisfied by the behavior model.

The contracts may be generated based on the requirements, the software components, the software models, the architecture model, and the timing semantics. The contracts may specify expected properties of the software components and the software models.

It may be determined whether the software components and the software models satisfy the contracts. For example, a static formal verification or a run-time based verification may be performed. The formal language or the modeling language used for the architecture model may be used to determine whether the contracts are satisfied.

If the software components and the software models satisfy the contracts, the models have been properly integrated. If the software components and the software models fail to satisfy the contracts, the architecture models and the timing semantics are modified, modified contracts are generated, and it may be determined whether the software components and the software models satisfy the modified contracts. This process may repeat until the modified contracts are satisfied.

The subject matter described herein may provide numerous benefits. For example, the subject matter may reliably integrate models for the next-generation model-based embedded systems design. The subject matter may describe a seamless bridge between architecture modeling, timing semantics, and contract-based composition of models. The subject matter may also describe a framework for performing formal evaluation of model-based system design, such as modeling checking, timing analysis, and architecture exploration. By applying these formal methods in the early-design phase, there may be improvement and enhanced construction in the embedded systems design, and a reduction of the overall development time.

According to one innovative aspect of the subject matter described in this disclosure, a system and method for designing a large-scale embedded system is described. The method may include designing one or more software models for one or more software components to be included in an embedded system, wherein the one or more software models describe one or more requirements for the one or more software components. The method may include collecting information from the one or more requirements, the one or more software components, and the one or more software models. The method may include generating one or more architecture model that describe an execution platform, physical constraints, non-functional constraints, and characteristics of the embedded system based on the collected information. The method may include determining timing semantics to be satisfied by execution of functions in the embedded system. The method may include integrating, by an electronic device, contracts based on the one or more requirements, the one or more software components, the one or more software models, the one or more architecture models, and the timing semantics. The method may include determining whether the one or more software components and the one or more software models satisfy the contracts.

Other aspects include corresponding methods, systems, apparatus, and computer program products.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
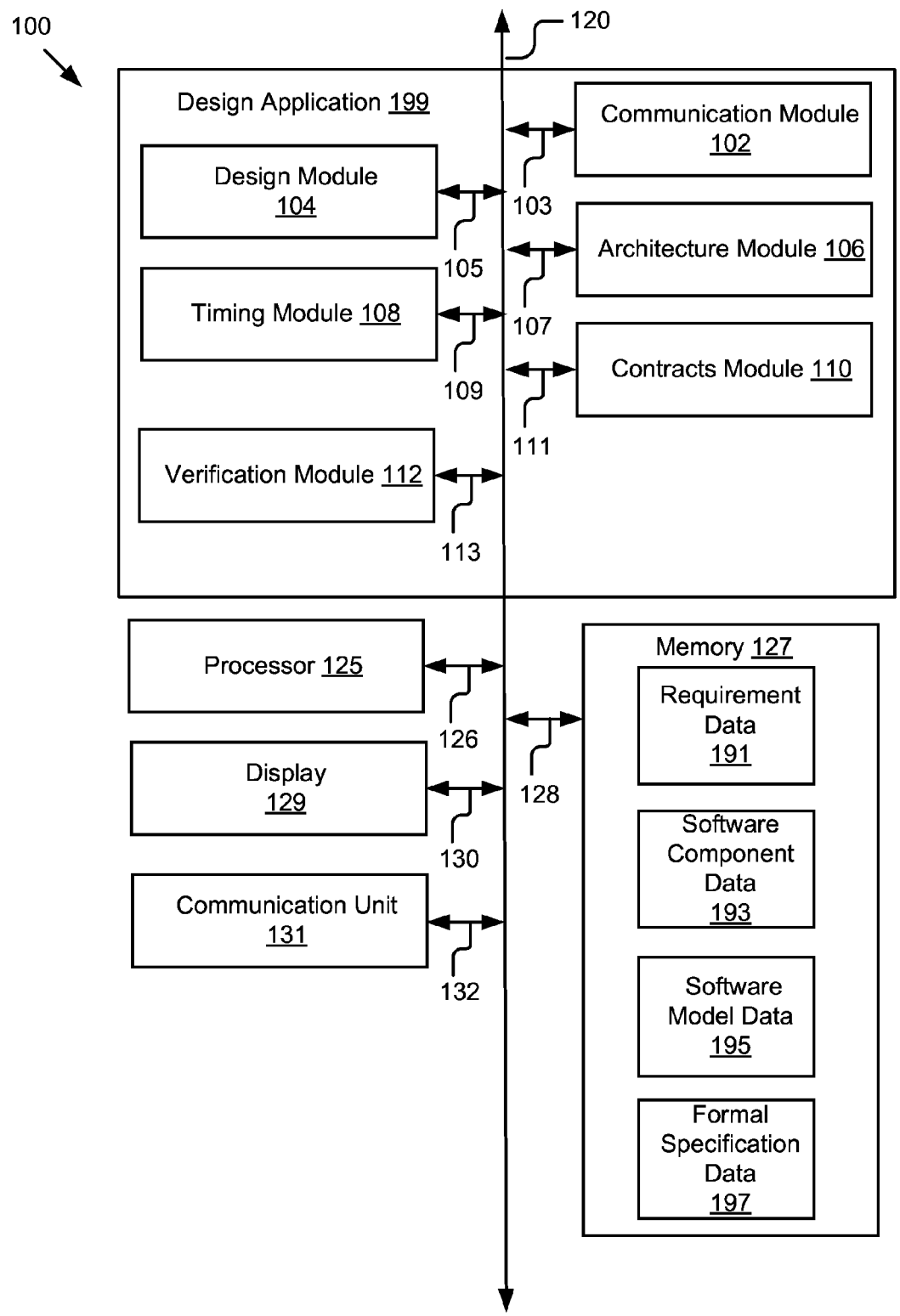
FIG. 1 is a block diagram illustrating an example device for designing an embedded system.

FIG. 1 is a block diagram illustrating an example device 100 for designing an embedded system. The device 100 can be used by an original equipment manufacturer (OEM) or a supplier as discussed in greater detail below with reference to FIG. 4. The device 100 may be, include, or be included in a server that a user accesses via a browser. In some implementations, the device 100 may include physical hardware directly accessed by the user, such as a desktop computer, a mobile computer, a laptop, a smartphone, or any other computing device that includes a memory and a processor. Although the components are illustrated as being part of a single device 100, the components may be part of a distributed system.

The device 100 can include a design application 199, a processor 125, a memory 127, a display 129, and a communication unit 131. The components of the design device 100 are communicatively coupled by a bus 120.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, a graphic processor unit (GPU) architecture or an architecture implementing a combination of instruction sets. Although FIG. 1 includes a single processor 125, multiple processors 125 may be included. Other processors, operating systems, sensors, displays, and physical configurations may be possible. The processor 125 is coupled to the bus 120 for communication with the other components via signal line 126.

The memory 127 stores instructions or data that may be executed by the processor 125. The instructions or data may include code for performing the techniques described herein. The memory 127 may include a dynamic random access memory (DRAM) device, a static random access memory (SRAM) device, flash memory, or some other memory device. In some implementations, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 127 is coupled to the bus 120 for communication with the other components via signal line 128.

As illustrated in FIG. 1, the memory 127 stores one or more of requirement data 191, software component data 193, software model data 195, and formal specification data 197. The requirement data 191 may include information about functional and non-functional requirements for a software component to perform. The requirements may be designed by a OEM, for example, using a formal language. The formal language may include a standardized way of describing the software components and one or more properties for the software components. The software component data 193 may include information about software components that satisfy the requirements described by the requirement data 191. The software model data 195 may include information about software models that are representations of the software components that are used to build virtual prototypes. The formal specification data 197 may include information about formal specifications that are used to integrate the software models. The formal specifications may include architecture models, timing semantics, and contracts.

A formal specification may be used by the OEM to provide the supplier with a framework of unambiguous interaction between the OEM and the supplier. The supplier may choose to use their own model design for production. However, the one or more architectural models and the one or more contracts included in the formal specification, describes the functional and non-functional requirements for the software components that must be designed by the supplier (and, optionally, other suppliers) using the formal language. In this way, the formal specification beneficially ensures that the OEM and the suppliers have the same understanding of how the embedded system and each software component integrated in the embedded system should be designed.

The display 129 can include hardware for displaying graphical data from the design application 199. For example, the display 129 renders graphics for displaying a user interface that displays information about a virtual prototype. The display 129 is coupled to the bus 120 via signal line 130.

The communication unit 131 can include hardware that transmits and receives data to and from the device 100. The communication unit 131 is coupled to the bus 120 via signal line 132. In some implementations, the communication unit 131 includes a port for direct physical connection to a network or to another communication channel. For example, the communication unit 131 includes a USB, SD, CAT-5, or similar port for wired communication with the device 100. In some implementations, the communication unit 131 includes a wireless transceiver for exchanging data with the device 100 or other communication channels using one or more wireless communication methods, including IEEE 802.11, IEEE 802.16, Bluetooth®, or another suitable wireless communication method.

In some implementations, the communication unit 131 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 131 includes a wired port and a wireless transceiver. The communication unit 131 also provides other conventional connections to the network for distribution of files or median objects using standard network protocols including TCP/IP, HTTP, HTTPS, and SMTP, etc.

The communication module 102 can include code and routines for handling communications between the design application 199 and other components of the device 100. In some implementations, the communication module 102 can include a set of instructions executable by the processor 125 to provide the functionality described below for handling communications between the design application 199 and other components of the object detection device 100. In some implementations, the communication module 102 can be stored in the memory 127 of the device 100 and can be accessible and executable by the processor 125.

The design application 199 may include a communication module 102, a design module 104, an architecture module 106, a timing module 108, an contracts module 110, and a verification module 112. Other design application 199 components are possible. For example, the design application 199 may additionally include a user interface module that generates graphical data that shows the progress of the design to a user. For example, the user interface module may generate a status report on the verification process.

The communication module 102 sends and receives data, via the communication unit 131, to and from the device 100. The communication module 102 may also send and receive data between components of the design application 199. The communication module 102 may also send and receive data between components of the design application 199 and components of the device 100, such as between the design application 199 and the display 129. The communication module 102 is coupled to the bus 120 via signal line 103.

The design module 104 can include code and routines for designing software models based on software components. In some implementations, the design module 104 can include a set of instructions executable by the processor 125 to provide the functionality described below for designing software models based on software components. In some implementations, the design module 104 can be stored in the memory 127 of device 100 and can be accessible and executable by the processor 125. The design module 104 is coupled to the bus 120 via signal line 105.

The design module 104 may design software components based on requirements. The requirements may be expressed in a formal language and specified by a OEM. The design module 104 may design software models based on the software components where the software models describe requirements for the software components.

Figure 2A:
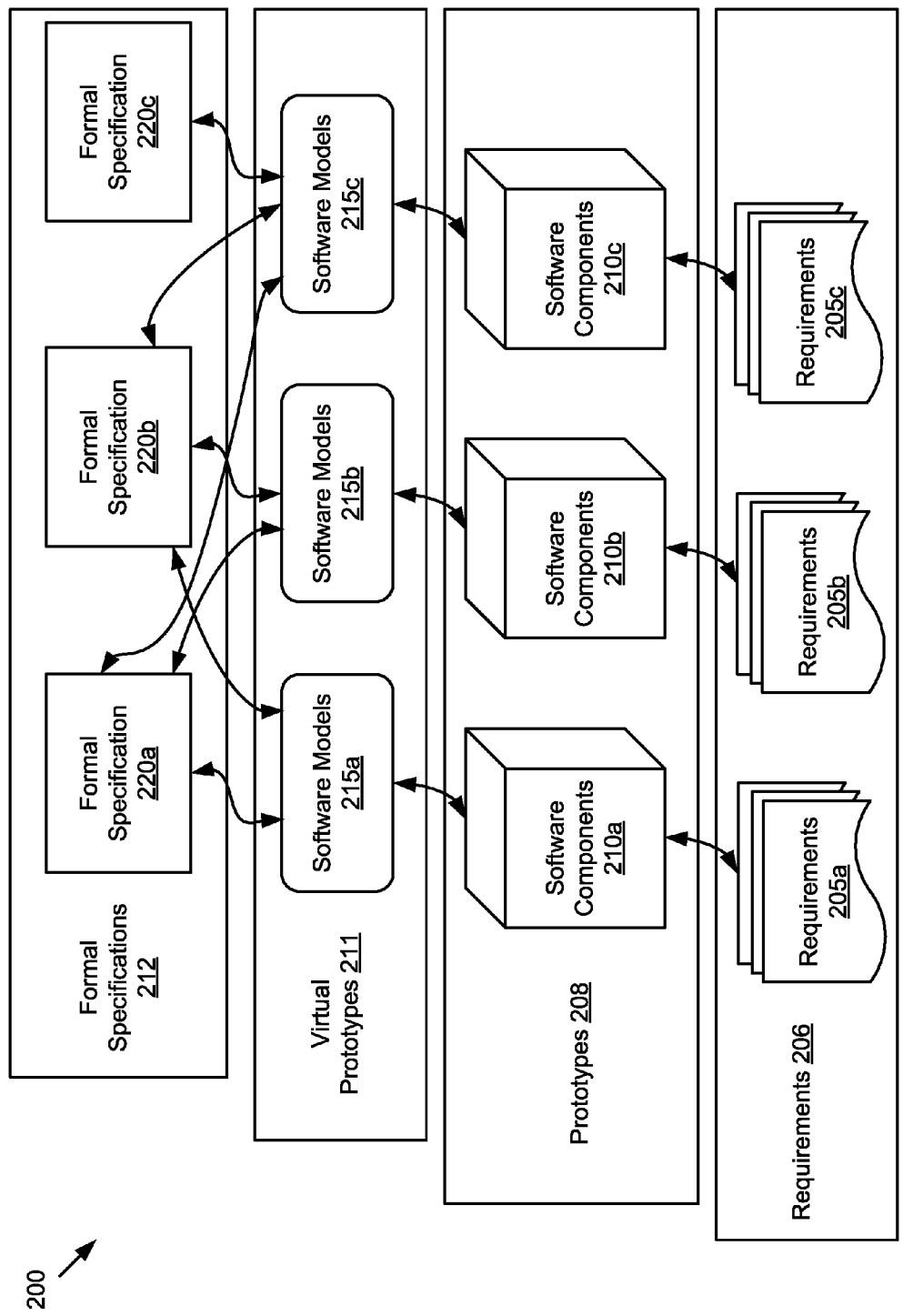
FIG. 2A is an example flowchart of a systematic method for designing an embedded system.

Turning now to FIG. 2A, an example flowchart 200 of a systematic method for designing an embedded system is illustrated. FIG. 2A represents a direction of the flow of information during the design process. The design process may be organized according to the following levels: requirements level 206, prototypes level 208, virtual prototypes level 211, and formal specifications level 212. The requirements level 206 includes a series of requirements 205a, 205b, and 205c. The prototypes level 208 includes software components 210a, 210b, and 210c. The virtual prototypes level 211 includes software models 215a, 215b, and 215c. The formal specifications stage 212 includes formal specifications 220a, 220b, and 220c.

Each discrete set of requirements 205a, 205b, 205c provides requirement data 191 to the software components 210a, 210b, 210c, respectively, in the prototypes level 208. Each of the software components 210a, 210b, 210c, provides software component data 193 to the software models 215a, 215b, 215c, respectively, in the virtual prototypes level 211. The software models 215a, 215b, 215c provides software model data 195 to different formal specifications 220a, 220b, 220c in the formal specification level 212.

The design module 104 may use the requirements data 191 to design software components 210, and the software components 210 may be used to design software models 215. As discussed in greater detail below, the formal specification level 212 includes formal specifications 220 that include architecture models generated by the architecture module 106, timing semantics generated by the timing module 108, and contracts generated by the contract module 110.

The architecture module 106 can include code and routines for generating an architecture model. In some implementations, the architecture module 106 can include a set of instructions executable by the processor 125 to provide the functionality described below for generating the architecture model. In some implementations, the architecture module 106 can be stored in the memory 127 of device 100 and can be accessible and executable by the processor 125. The architecture module 106 is coupled to the bus 120 via signal line 107.

The architecture module 106 collects information from the requirements, the software components, and the software models. For example, the architecture module 106 may receive software model data 195 that includes the information from the requirements, the software components, and the software models. The architecture module 106 may provide the collected information to the timing module 108, which uses the collected information to determine timing semantics.

Figure 2B:
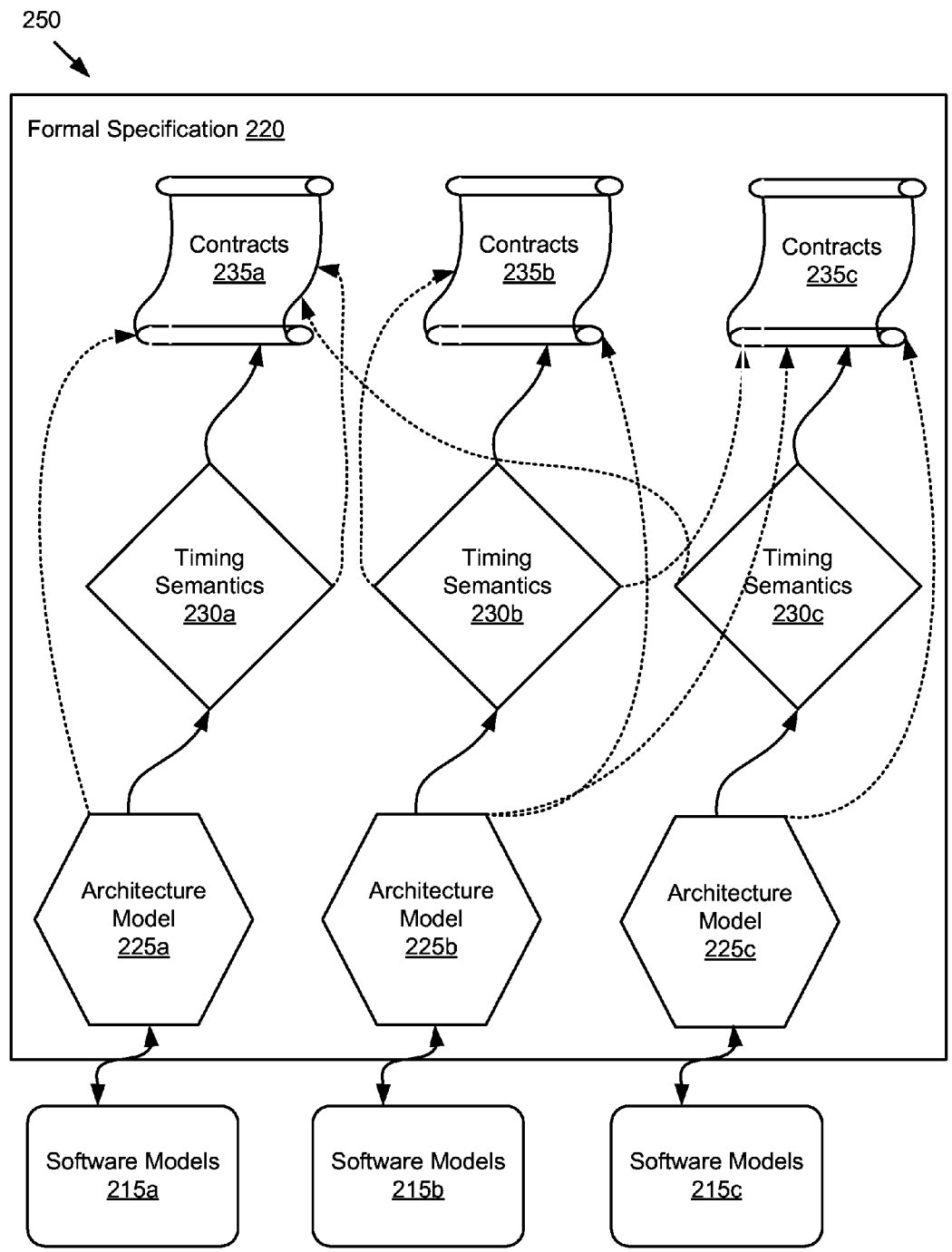
FIG. 2B is an example flowchart of the formal specification illustrated in FIG. 2A.

Turning to FIG. 2B, an example flowchart 250 of the formal specification 220 from FIG. 2A is illustrated. The formal specification 220 includes architecture models 225a, 225b, and 225c; timing semantics 230a, 230b, 230c; and contracts 235a, 235b, 235c. The architecture models, the timing semantics, and the contracts are built based on the corresponding software models 215 in a hierarchical manner. The architecture module 106 generates the architecture model 225a based on software model data 195 from the software models 215a, 215b, 215c. The timing semantics 230 are discussed in greater detail below with reference to the timing module 108. The contracts 235 are discussed in greater detail below with reference to the contracts module 110.

The architecture module 106 may determine hardware and software architecture for software models 215 and software components 210 from the software model data 195. The architecture module 106 generates an architecture model that describes an execution platform, physical constraints, non-functional constraints, and characteristics of an embedded system based on the collected information. For example, an embedded system for a vehicle may include the following hardware and software: electronic control units (ECUs), a bus, sensors, and actuators.

In some implementations, the architecture module 106 generates a standardized architecture model in an embedded system design that includes a modeling language or a formal language, such as architecture analysis and design language (AADL), AUTomotive Open System Architecture (AUTOSAR), SYStem Modeling Language (SYSML), Modeling and Analysis of Real-Time and Embedded systems (MARTE), etc.

In some implementations, the architecture module 106 develops behavior models to run on the architecture model. System properties including timing constraints, performance, and cost may be evaluated based on both the behavior models and the architecture model.

The timing module 108 can include code and routines for determining timing semantics. In some implementations, the timing module 108 can include a set of instructions executable by the processor 125 to provide the functionality described below for determining timing semantics. In some implementations, the timing module 108 can be stored in the memory 127 of device 100 and can be accessible and executable by the processor 125. The timing module 108 is coupled to the bus 120 via signal line 109.

The timing module 108 may determine timing semantics to be satisfied by execution of functions in the embedded system. For example, the timing module 108 may determine timing semantics based on the architecture model and the software models, along with the timing characteristics of the architecture model and the software models. In some implementations, timing semantics, including timing constraints, are defined on the behavior model running on a specific architecture as formalized by the architecture model generated by the architecture module 106. The timing semantics may include functions that are correctly executed.

The timing semantics may include the following properties of the embedded system: (1) synchronization and ordering of events as the abstraction results of data exchange among functions, software components, etc.; (2) a computing time that describes a time needed for execution of the functionality on the specific architecture; (3) a delay time that describes a time needed for the execution of a specific functionality; and (4) other timing properties. In some implementations, the timing semantics does not include specific-execution related issues, such as scheduling, because the timing specification is incorporated as constraints to be satisfied by all possible correct executions.

The timing semantics may be described using a standardized, formal, and multiclock timing model. For example, the timing semantics may be described using MARTE clock constraint specification language (CCSL) or AADL synchronous timing annex (ongoing).

The contracts module 110 can include code and routines for generating contracts. In some implementations, the contracts module 110 can include a set of instructions executable by the processor 125 to provide the functionality described below for generating contracts. In some implementations, the contracts module 110 can be stored in the memory 127 of device 100 and can be accessible and executable by the processor 125. The contracts module 110 is coupled to the bus 120 via signal line 111.

The contracts module 110 may generate contracts that indicate assumptions of preconditions (e.g., safety, performance, cost, etc.) and guarantees of post-conditions between software components 210 and software models 215. The contracts module 110 may generate the contracts based on the timing semantics. The contracts may be defined using formal languages to enable the formation of the formal specification and verification of the contracts. For example, the contract can be specified using common computational temporal logic, including linear temporal logic (LTL), computational tree logic (CTL), or CTL*. The contracts may be particularly helpful for safety-critical embedded systems.

The contracts module 110 may generate contracts based on the requirements, the software components, the software models, and the architecture model. For example, the contracts module 110 may use the contracts to determine the correctness and reliability of software model 215 composition and integration.

The verification module 112 can include code and routines for analyzing the contracts. In some implementations, the verification module 112 can include a set of instructions executable by the processor 125 to provide the functionality described below for analyzing the contracts. In some implementations, the verification module 112 can be stored in the memory 127 of device 100 and can be accessible and executable by the processor 125. The verification module 112 is coupled to the bus 120 via signal line 113.

The verification module 112 may analyze the contracts to determine whether the contracts are satisfied. The verification module 112 may perform a static formal verification, such as model check verification, or a run-time based verification.

The verification module 112 is able to perform verification because the requirements 205, the architecture models 225, the timing semantics 230, and the contracts 235 are created using modeling languages or formal languages. In some implementations, the verification module 112 analyzes the requirements 205, the architecture models 225, and model integration. If the verification module 112 detects a problem, the verification module 112 may instruct the design module 104 to modify the software components 210 or the software models 215, the architecture module 106 to modify the architecture models 225, or the timing module 108 to modify the timing semantics 230. If the verification module 112 does not detect a problem, the verification module 112 may determine that the models can be used to build components for prototyping.

Figure 2C:
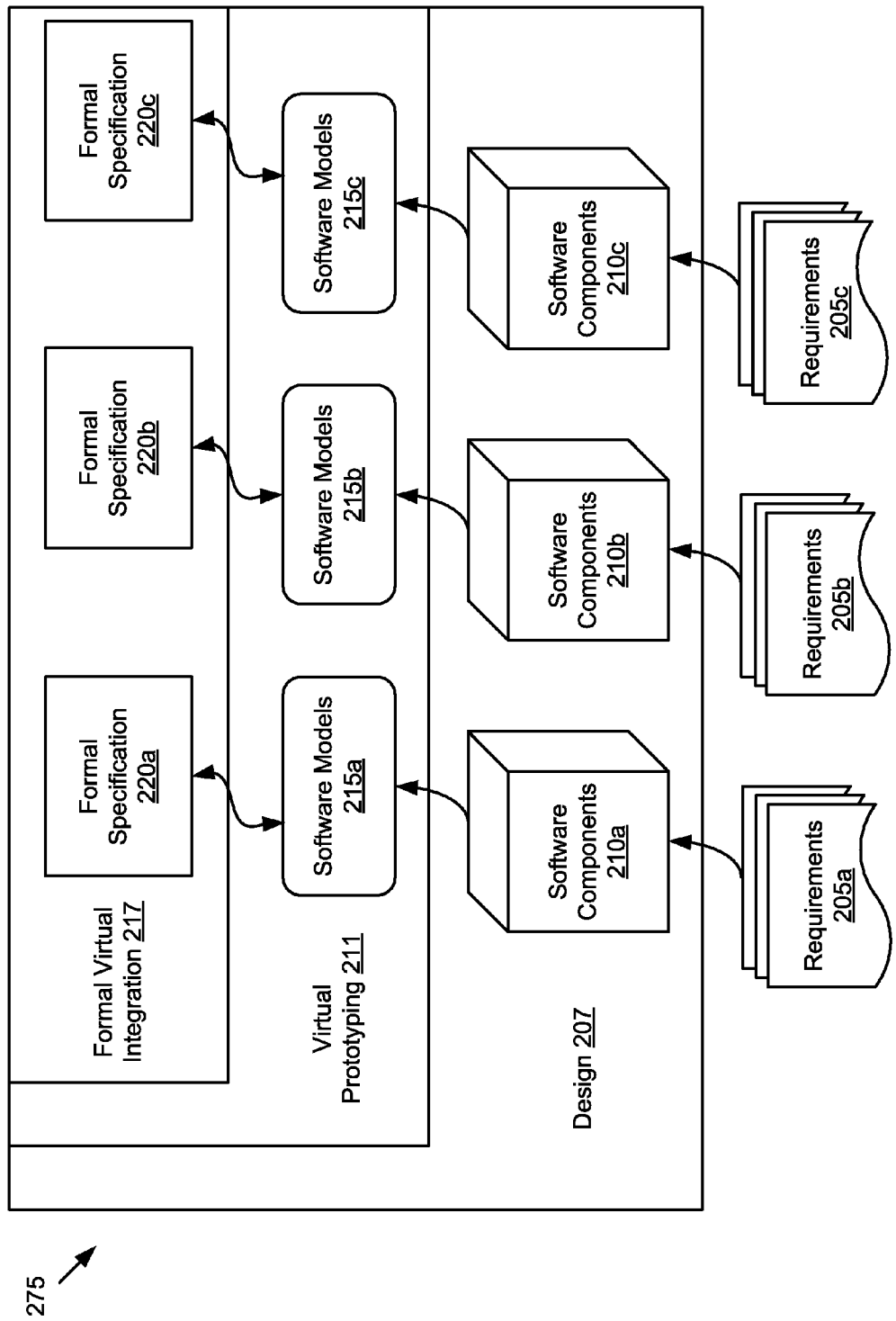
FIG. 2C is an example flowchart of an overall method for designing an embedded system.

FIG. 2C is an example flowchart 275 of an overall method for designing an embedded system. In this example, the engineering process includes a design phase 207 and a virtual prototyping phase 211. The formal virtual integration 217 is a subset of the virtual prototyping phase 211 that ensures the correctness and reliability of the integration.

Figure 3:
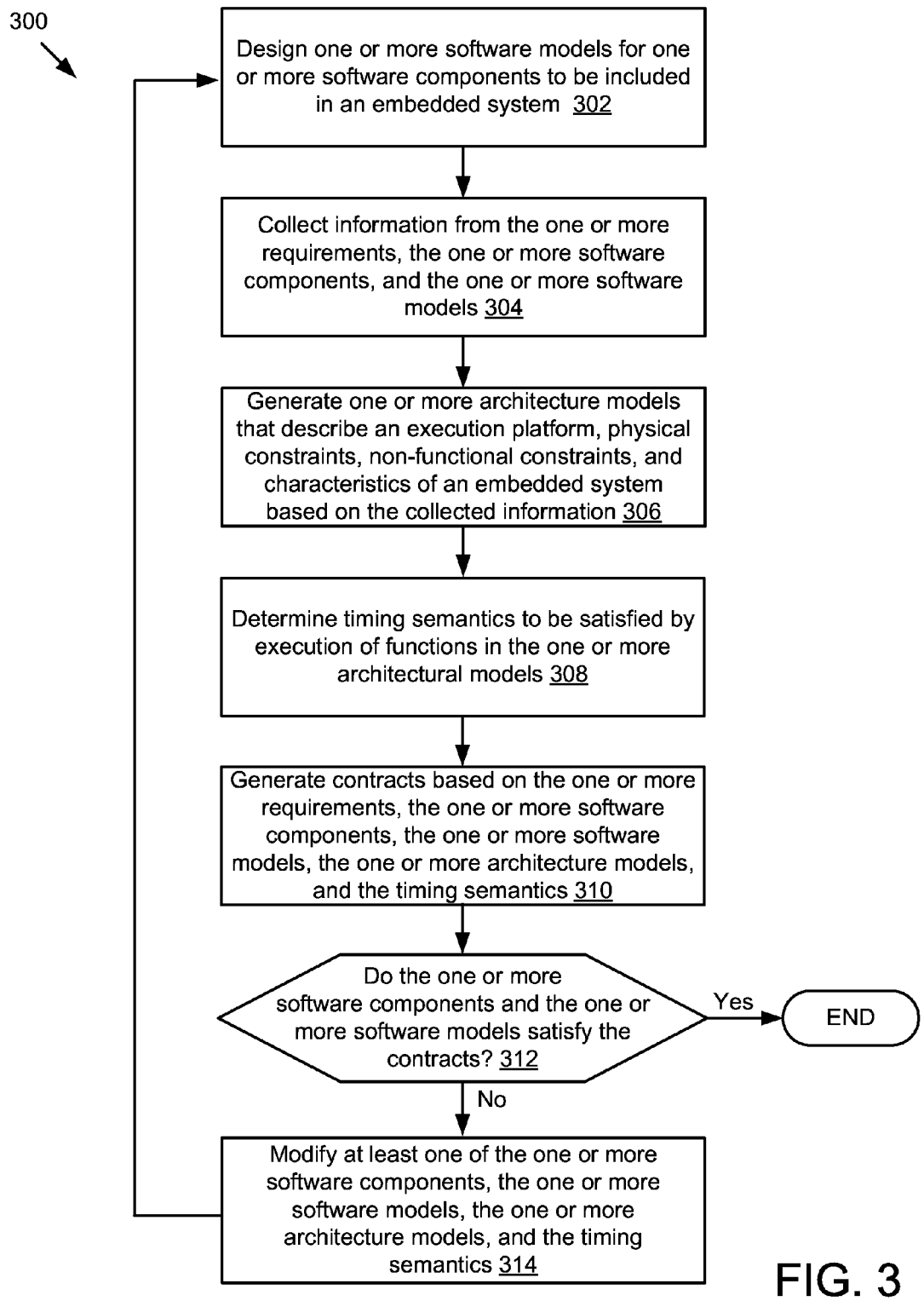
FIG. 3 is a flowchart of an example method for designing an embedded system.

FIG. 3 is a flowchart of an example method 300 for designing an embedded system, arranged according to some embodiments. The method may be performed by a design application 199 stored on the device 100 of FIG. 1. The device 100 may be a special-purpose computing device configured to provide some or all of the functionality described with reference to FIG. 3.

At block 302, one or more software models are designed for one or more software components to be included in an embedded system. The one or more software models may include one or more requirements for the one or more software components. For example, the one or more software models may describe one or more functional or non-functional requirements for the one or more software components. The one or more software components may be integrated to form an embedded system. The one or more software models may be described using a formal language. Optionally, the one or more software models may be described using a modeling language.

At block 304, information is collected from the one or more requirements, the one or more software components, and the one or more software models. The information may include requirement data 191, software component data 193, and software model data 195 that is used to build the formal specification 220 of FIG. 2B, which includes architecture models 225, timing semantics 230, and contracts 235.

At block 306, one or more architecture models are generated that describes an execution platform, physical constraints, non-functional constraints, and characteristics of an embedded system based on the collected information. Behavior models may also be generated based on the collected information to run on the one or more architecture models.

At block 308, timing semantics are determined to be satisfied by execution of functions in the architectural model. The timing semantics may include timing constraints defined on the behavior model as formalized by the one or more architecture models.

At block 310, contracts are generated based on the one or more requirements, the one or more software components, the one or more software models, the one or more architecture models, and the timing semantics. The contract may be described using a formal language. The contract may specify the expected properties of the software components and software models.

At block 312, the method 300 determines whether the one or more software components and the one or more software models satisfy the contracts. Determining whether the one or more software components and the one or more software models satisfy the contracts includes a formal verification method that may include determining whether each contract satisfies the properties it promises to guarantee if the assumed preconditions included in the contract exist. In this way, the one or more contracts are a reflection of the requirements on the one or more models. This verification step may include static formal verification, such as model check verification, or run-time based verification.

If the one or more software components and the one or more software models fail to satisfy the contract, at block 314 at least one of the one or more software components, the one or more software models, one or more architectural models, and the timing semantics are modified, modified contracts are generated, and the method 300 determines whether the one or more software components and the one or more software models satisfy the modified contracts. If the method 300 determines that the one or more software components and the one or more software models satisfy the modified contracts, the method 300 ends. If the method 300 determines that the one or more software components and the one or more software models fail to satisfy the modified contracts, then the method 300 returns to block 302. Optionally, the method 300 may be configured so that steps 314, and 302-312 are repeated until the one or more software components and the one or more software models satisfy the modified contracts.

Figure 4:
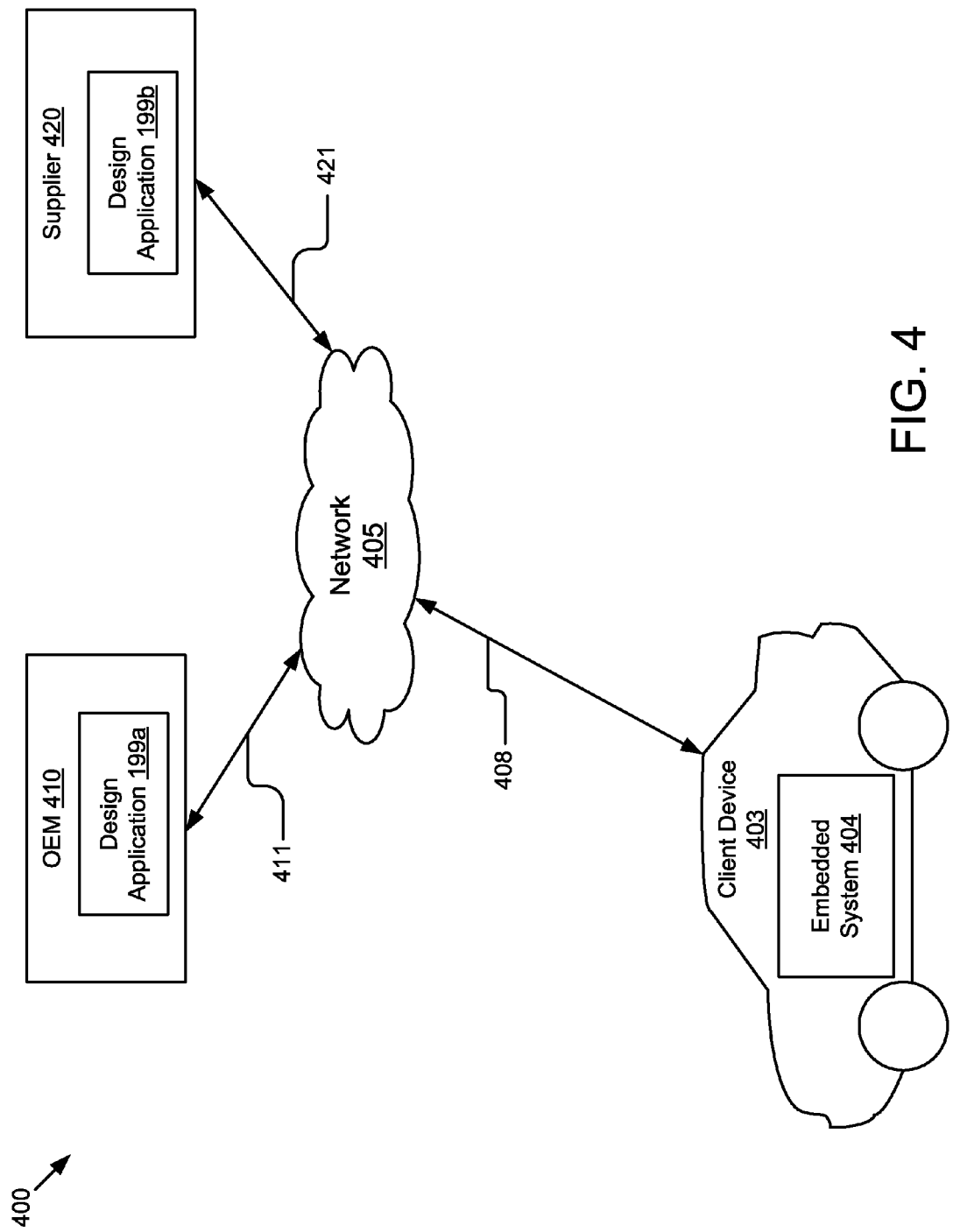
FIG. 4 is a block diagram including an example system for designing an embedded system.

FIG. 4 is a block diagram including an example system 400 for designing an embedded system. The system 400 includes an OEM 410, a supplier 420, and a client device 403. The OEM 410 may access a design application 199a. For example, the OEM 410 may use the design application 199a to generate software components 210 and software models 215. The OEM 410 may share the software components 210, the software models 215, and formal specifications 220 that includes contracts 235 that describe the functional and non-functional requirements for the software components 210 that must be designed by the supplier (and, optionally, other suppliers) using the formal language.

The supplier 420 may include a design application 199b that receives the software components 210, the software models 215, and formal specifications 220. The supplier 420 may use the design application 199b to create software components 210 according to the formal specifications 220.

The OEM 410 and the supplier 420 may communicate via a network 405. The OEM 410 may access the network 405 via signal line 411. The supplier 420 may access the network 405 via signal line 421.

The network 405 can include a conventional type, wired or wireless, and may have numerous different configurations including a star configuration, token ring configuration, or other configurations. Furthermore, the network 405 may include a local area network (LAN), a wide area network (WAN) (e.g., the Internet), or other interconnected data paths across which multiple devices may communicate. In some implementations, the network 405 may be a peer-to-peer network. The network 405 may also be coupled to or include portions of a telecommunications network for sending data in a variety of different communication protocols. In some implementations, the network 405 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 405 may include a global positioning system (GPS) satellite. The network 405 may be a mobile data network, for example, 3G, 4G, LTE, Voice-over-LTE ("VoLTE"), or any other mobile data network or combination of mobile data networks. In some implementations, the network 405 may be a combination of different networks.

The OEM 410 may receive software components 210 from the supplier 420. For example, the supplier 420 may transmit the software components 210 via the network 405 or the supplier 420 may physically provide the software components 210, such as by providing the OEM with software components 210 on a tangible computer-readable medium. The OEM 410 may receive software components 210 from multiple suppliers 420.

The OEM 410 may generate an embedded system 404. The embedded system 404 may be used in a client device 403, such as the vehicle illustrated in FIG. 4. The embedded system 404 may be used in vehicles, for example, to provide infotainment, enable wireless connectivity to the network, maximize efficiency, reduce pollution, to implement anti-lock braking systems, for electronic stability control, automatic four-wheel drive, and for an advanced driver assistance system.

Figure 5:
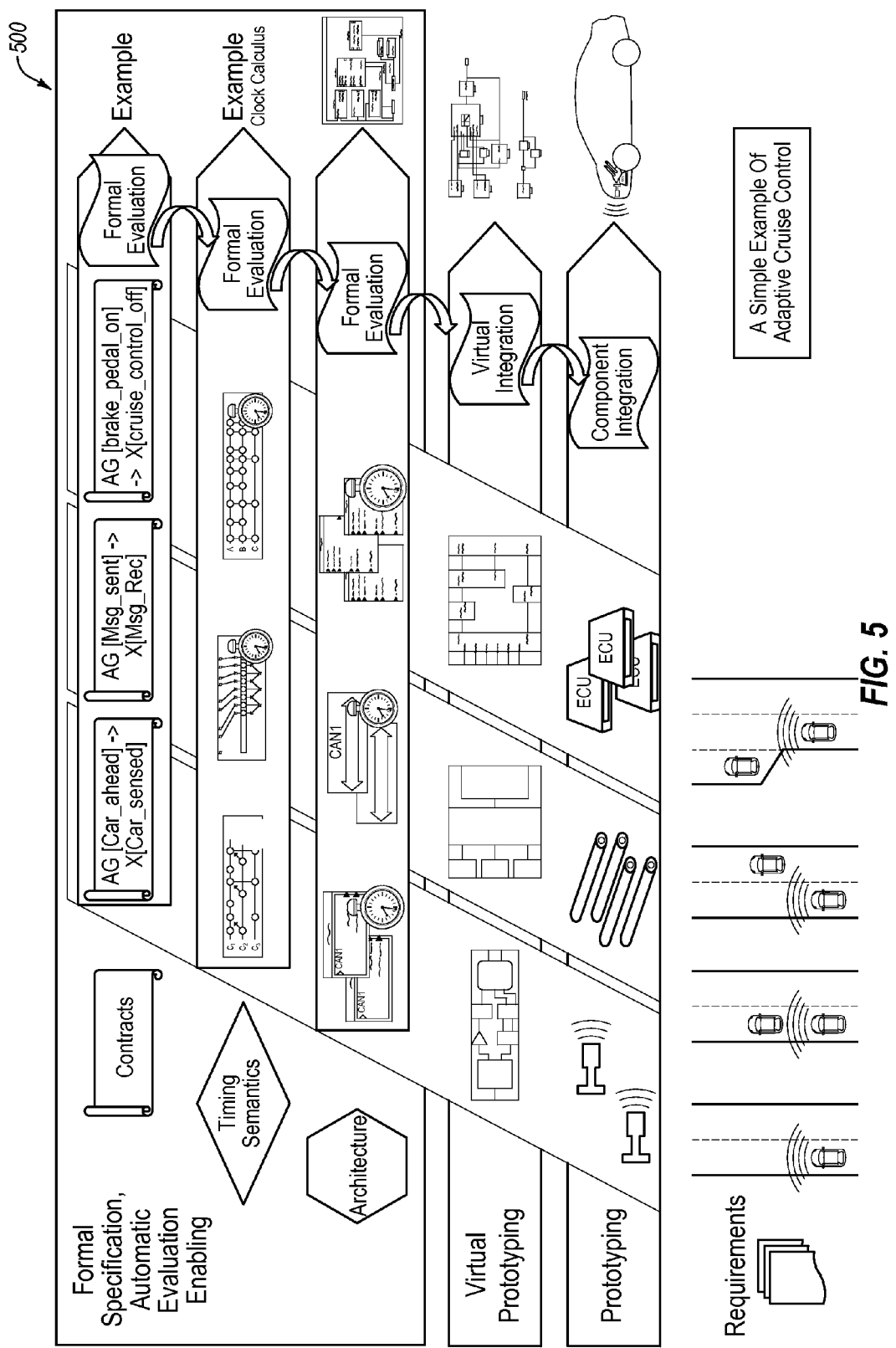
FIG. 5 is a flowchart of an example method for designing an advanced driver assistance system.

FIG. 5 is a flowchart of an example method 500 for designing an advanced driver assistance system (ADAS). Specifically, the ADAS system may include an embedded system for adaptive cruise control. The method 500 may be implemented using the system 400 illustrated in FIG. 4. The requirements stage may include requirements for detecting objects in front of a vehicle including other vehicles directly in front of the vehicle and other vehicles in adjacent lanes. The prototyping stage may include designing software components based on requirements for the ADAS system. For example, the software components may be designed for hardware involved in the ADAS system, such as for sensors that detect objects in the road and determine a distance between the client device 403 and the objects. The hardware may also include hardware or software for transmitting instructions between different software components. The hardware may also include hardware configured to apply a brake to the client device 403 and hardware to modify the settings for the cruise control. The virtual prototyping stage may include designing software models that include the software components and how the different software components interact in the embedded system.

The formal specification includes architecture models, timing semantics, and contracts. The architecture models describe an execution platform, physical constraints, non-functional constraints, and characteristics of the embedded system. The timing semantics describe timing constraints to be satisfied by the execution of functions in the architectural model. In this example, the timing semantics are determined based on a clock calculus. The contracts include assumptions of preconditions and guarantees of post-conditions between the software components and the software models.

The method 500 determines whether the software components and the software models satisfy the contracts by performing a formal evaluation of the contracts, the timing semantics, and the architecture. The method 500 also analyzes the virtual integration and the component integration to determine whether the software components and the software models satisfy the contracts.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the implementations can be described above primarily with reference to user interfaces and particular hardware. However, the implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The implementations of the specification can also relate to a processor for performing one or more steps of the methods described above. The processor may be a special-purpose processor selectively activated or reconfigured by a computer program stored in the computer. Such a computer program may be stored in a computer-readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method of designing a large-scale embedded system for an original equipment manufacturer, the method comprising:
   designing one or more software models for one or more software components to be included in an advanced driver assistance system of a vehicle that includes an embedded system, wherein the one or more software models describe one or more requirements for detecting objects at least substantially in front of the vehicle and the one or more software components are associated with operation of hardware that is controllable by the advanced driver assistance system;
   collecting information from the one or more requirements for detecting the objects at least substantially in front of the vehicle, the one or more software components that are associated with operation of the hardware, and the one or more software models;
   generating one or more architecture models that describe an execution platform, physical constraints, non-functional constraints, and characteristics of the embedded system based on the collected information;
   determining timing semantics to be satisfied by execution of functions in the embedded system based on ordering of events;
   generating, by an electronic device, initial contracts based on the one or more requirements, the one or more software components, the one or more software models, the one or more architecture models, and the timing semantics;
   determining, by the electronic device, whether the one or more software components and the one or more software models satisfy the initial contracts;
   responsive to the initial contracts failing to be satisfied, modifying at least one of the one or more software components, the one or more software models, the one or more architecture models, and the timing semantics;
   generating modified contracts based on modifying at least one of the one or more software components, the one or more software models, the one or more architecture models, and the timing semantics; and
   determining that the one or more software components and the one or more software models satisfy the modified contracts.

2. The method of claim 1, wherein determining, by the electronic device, whether the one or more software components and the one or more software models satisfy the initial contracts is based on a run-time based verification.

3. The method of claim 1, wherein determining timing semantics to be satisfied by executions of functions in the embedded system includes functions that are correctly executed.

4. The method of claim 1, wherein determining timing semantics to be satisfied by executions of functions in the embedded system is further based on synchronization of events, computing a time to execute the functions in the embedded system, and delay that occurs when executing the functions and communication between the functions.

5. The method of claim 1, wherein determining whether the one or more software components and the one or more software models satisfy the initial contracts includes performing a static formal verification.

6. The method of claim 1, wherein the initial contracts indicate assumptions of preconditions that include safety, performance, and cost, and guarantees of post-conditions between the software components and the software models.

7. The method of claim 1, further comprising developing one or more behavior models to run on the one or more architecture models and wherein determining timing semantics includes timing semantics to be satisfied by the one or more behavior models.

8. The method of claim 1, wherein the initial contracts specify expected properties of the one or more software components and the one or more software models.

9. The method of claim 1, wherein the one or more architecture models are generated using a modeling language or a formal language, and wherein the modeling language or the formal language is used to determine whether the initial contracts are satisfied based on the one or more requirements, the one or more software components, the one or more software models, the one or more architecture models, and the timing semantics.

10. The method of claim 1, wherein the advanced driver assistance system is a system for adaptive cruise control.

11. A non-transitory computer-readable medium for designing a large-scale embedded system, the non-transitory computer-readable medium having computer instructions stored thereon that are executable by a processing device to perform or control performance of steps comprising:
   designing one or more software models for one or more software components to be included in an advanced driver assistance system of a vehicle that includes an embedded system, wherein the one or more software models describe one or more requirements for detecting objects at least substantially in front of the vehicle and the one or more software components are associated with operation of hardware that is controllable by the advanced driver assistance system;
   collecting information from the one or more requirements for detecting the objects at least substantially in front of the vehicle, the one or more software components that are associated with operation of the hardware, and the one or more software models;
   generating one or more architecture models that describe an execution platform, physical constraints, non-functional constraints, and characteristics of the embedded system based on the collected information;
   determining timing semantics to be satisfied by execution of functions in the embedded system based on ordering of events;
   generating initial contracts based on the one or more requirements, the one or more software components, the one or more software models, the one or more architecture models, and the timing semantics;
   determining whether the one or more software components and the one or more software models satisfy the initial contracts;
   responsive to the initial contracts failing to be satisfied, modifying at least one of the one or more software components, the one or more software models, the one or more architecture models, and the timing semantics;
   generating modified contracts based on modifying at least one of the one or more software components, the one or more software models, the one or more architecture models, and the timing semantics; and determining that the one or more software components and the one or more software models satisfy the modified contracts.

12. The non-transitory computer-readable medium of claim 11, wherein determining whether the one or more software components and the one or more software models satisfy the initial contracts is based on a run-time based verification.

13. The non-transitory computer-readable medium of claim 11, wherein determining timing semantics to be satisfied by executions of functions in the embedded system includes functions that are correctly executed.

14. The non-transitory computer-readable medium of claim 11, wherein determining timing semantics to be satisfied by executions of functions in the embedded system is further based on synchronization of events, computing a time to execute the functions in the embedded system, and delay that occurs when executing the functions and communication between the functions.

15. The non-transitory computer-readable medium of claim 11, wherein determining whether the one or more software components and the one or more software models satisfy the initial contracts includes performing a static formal verification.

16. The non-transitory computer-readable medium of claim 11, wherein the initial contracts indicate assumptions of preconditions that include safety, performance, and cost, and guarantees of post-conditions between the software components and the software models.

17. The non-transitory computer-readable medium of claim 11, wherein the steps further comprise developing one or more behavior models to run on the one or more architecture models and wherein determining timing semantics includes timing semantics to be satisfied by the one or more behavior models.

18. The non-transitory computer-readable medium of claim 11, wherein the initial contracts specify expected properties of the one or more software components and the one or more software models.

19. The non-transitory computer-readable medium of claim 11, wherein the one or more architecture models are generated using a modeling language or a formal language, and wherein the modeling language or the formal language is used to determine whether the initial contracts are satisfied based on the one or more requirements, the one or more software models, the one or more architecture models, and the timing semantics.

20. A method of designing a large-scale embedded system for an original equipment manufacturer, the method comprising:

designing one or more software models for one or more software components to be included in an advanced driver assistance system of a vehicle that includes an embedded system, wherein the one or more software models describe one or more requirements for detecting objects at least substantially in front of the vehicle and the one or more software components are associated with operation of hardware that is controllable by the advanced driver assistance system;

collecting information from the one or more requirements for detecting the objects at least substantially in front of the vehicle, the one or more software components that are associated with operation of the hardware, and the one or more software models;

generating one or more architecture models that describe an execution platform, physical constraints, non-functional constraints, and characteristics of the embedded system based on the collected information;

determining timing semantics to be satisfied by execution of functions in the embedded system based on synchronization and ordering of events, computing a time to execute the functions in the embedded system, and delay that occurs when executing the functions, wherein the timing semantics are based on a multiclock timing model;

generating, by an electronic device, initial contracts based on the one or more requirements, the one or more software components, the one or more software models, the one or more architecture models, and the timing semantics;

determining, by the electronic device, whether the one or more software components and the one or more software models satisfy the initial contracts;

responsive to the contracts failing to be satisfied, modifying the one or more software components, the one or more software models, the one or more architecture models and the timing semantics;

generating modified contracts; and determining whether the one or more software components and the one or more software models satisfy the modified contracts.

* * * * *